Figures 1, 7:
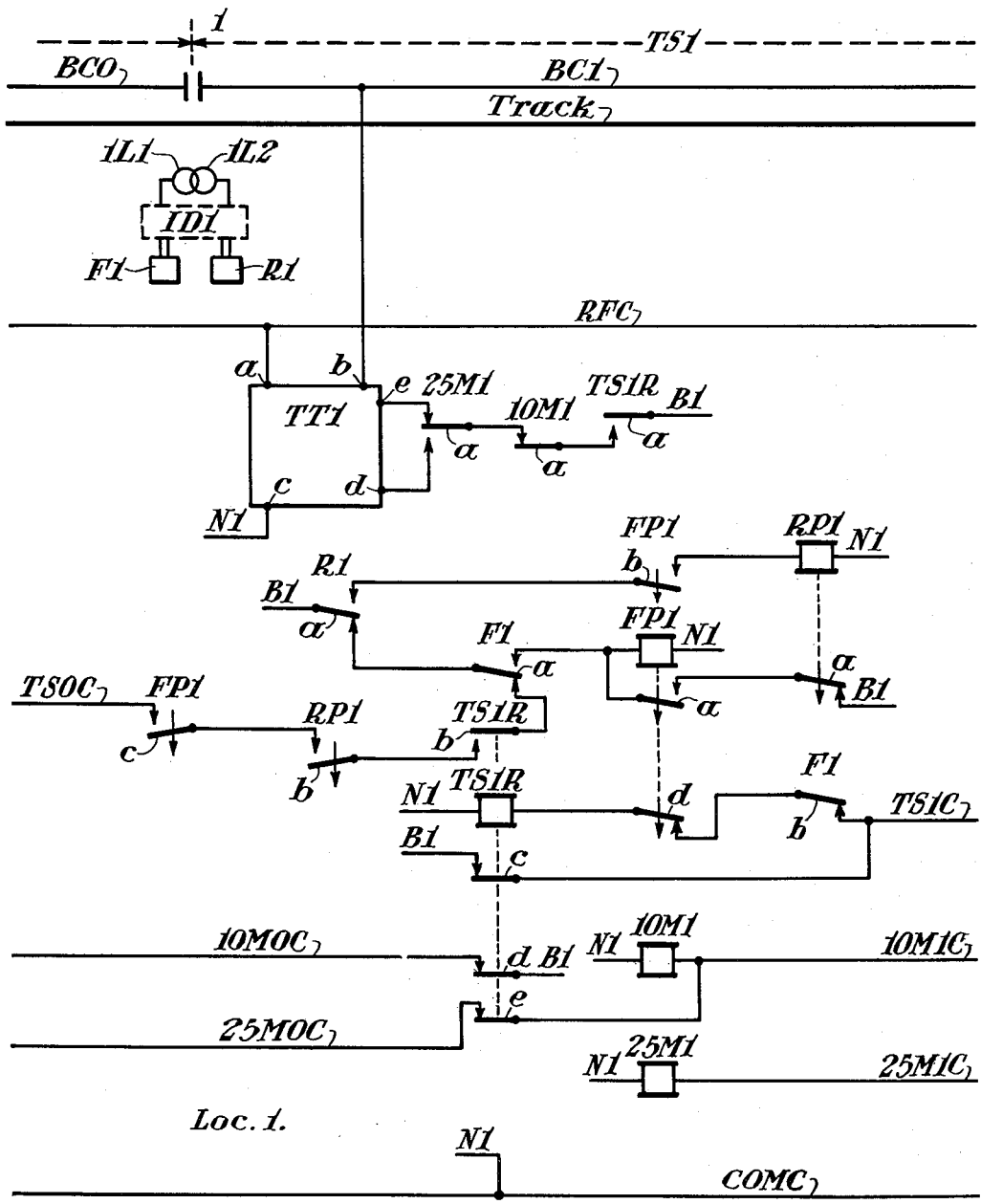

June 26, 1962 — F. T. PASCOE ET AL — 3,041,448
AUTOMATIC TRAIN OPERATION SYSTEM
Filed Feb. 20, 1961 — 7 Sheets-Sheet 1

INVENTORS.
Frank T. Pascoe and
Leslie R. Allison
BY W. L. Stout
THEIR ATTORNEY

June 26, 1962  F. T. PASCOE ET AL  3,041,448
AUTOMATIC TRAIN OPERATION SYSTEM
Filed Feb. 20, 1961  7 Sheets-Sheet 2

INVENTORS.
Frank T. Pascoe and
Leslie R. Allison
BY
W. L. Stout
THEIR ATTORNEY

INVENTORS.
Frank T. Pascoe and
Leslie R. Allison
BY
W. L. Stout
THEIR ATTORNEY

INVENTORS.
Frank T. Pascoe and
Leslie R. Allison
BY
W. L. Stout
THEIR ATTORNEY

INVENTORS.
Frank T. Pascoe and
Leslie R. Allison
BY
W. L. Stout
THEIR ATTORNEY

INVENTORS.
Frank T. Pascoe and
Leslie R. Allison
BY W. L. Stout
THEIR ATTORNEY

June 26, 1962   F. T. PASCOE ET AL   3,041,448
AUTOMATIC TRAIN OPERATION SYSTEM
Filed Feb. 20, 1961   7 Sheets-Sheet 7

INVENTORS.
Frank T. Pascoe and
Leslie R. Allison
BY
W. L. Stout
THEIR ATTORNEY

United States Patent Office 3,041,448
Patented June 26, 1962

3,041,448
AUTOMATIC TRAIN OPERATION SYSTEM
Frank T. Pascoe, Scott Township, Allegheny County, and Leslie R. Allison, Forest Hills, Pa., assignors to Westinghouse Air Brake Company, Wilmerding, Pa., a corporation of Pennsylvania
Filed Feb. 20, 1961, Ser. No. 90,493
2 Claims. (Cl. 246—63)

Our invention relates to an automatic train operation system for automatically controlling the movements of trains in a single direction over a stretch of railway track, and is particularly applicable to railways of the monorail type.

The object of this invention is to provide an automatic train operation system for operatorless trains traversing a stretch of railway track in which no track circuits are or can be provided, the stopping, starting and speed of the trains being controlled entirely automatically.

A further object of our invention is to provide for following train movements in an automatic train operation system for operatorless trains, each following train being automatically controlled, commensurate with the safety required, in accordance with the distance between it and the immediately preceding train.

A third object of the invention is to provide a reliable and economical automatic train operation system in which a train is automatically reduced in speed as it approaches a location at which it is to make a stop, and is automatically stopped at such location.

A still further object is to automatically control the opening of doors of a train and maintain them open for a predetermined period of time following a train stop at a prescribed stop location, and thereafter automatically controlling the doors to close and the train to start and accelerate to a predetermined speed.

In accomplishing the foregoing objects of our invention, we employ, in conjunction with train-carried apparatus for operating trains in accordance with each of a plurality of received radio signals, radio receiving apparatus on each train for receiving said signals and means, at each of a plurality of locations in a track stretch over which the trains are to travel, for selecting and transmitting to each train at various times each of said plurality of signals, the signal transmitted to each train being selected in accordance with traffic conditions and the location of the train in the track stretch.

Other objects and characteristic features of our invention will become apparent as the description proceeds.

We shall first describe one embodiment of our invention and shall then point out the novel features thereof in claims.

In the accompanying drawings, FIGS. 1 through 6 when arranged as shown in FIG. 7 comprise a diagrammatic view of a stretch of railway track provided with the radio signal control and transmitting apparatus employed in our invention.

Figure 8:
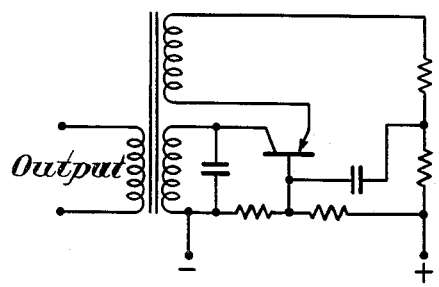

FIG. 8 is a circuit drawing of a typical tone transmitter which may be employed in our invention for transmitting radio signals.

Figure 9:
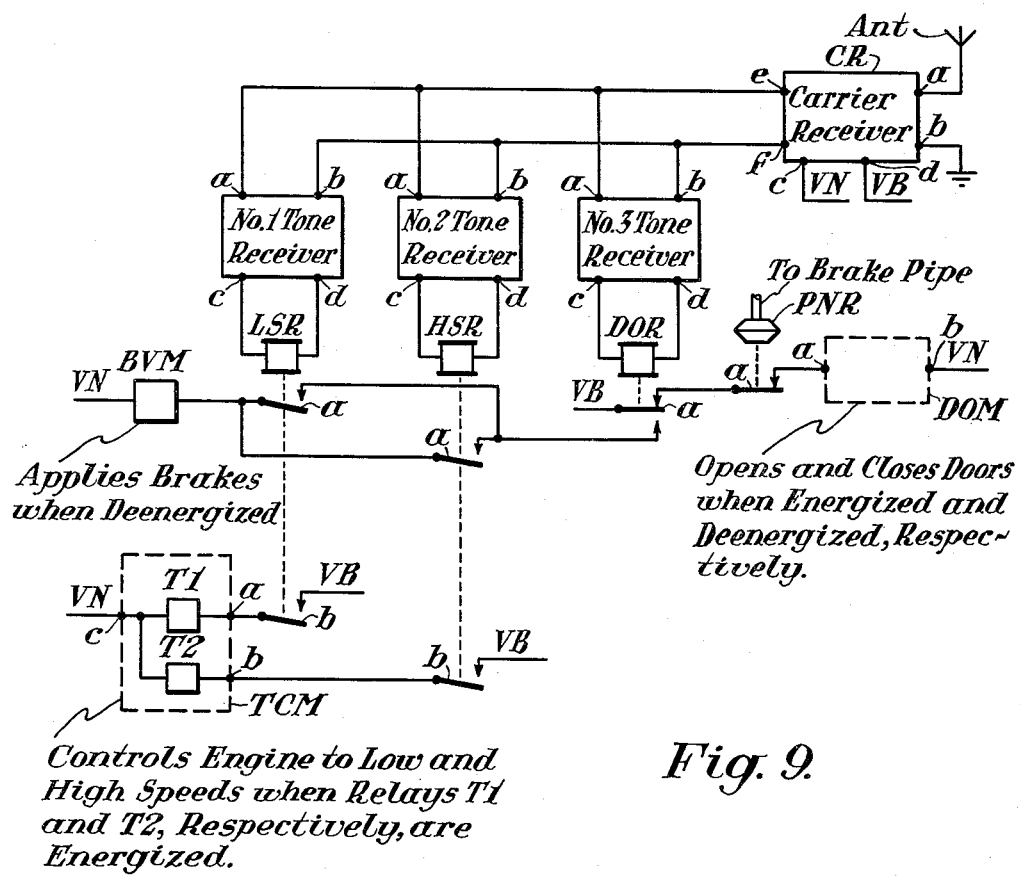

FIG. 9 compirses a diagrammatic view of the train-carried signal receiving apparatus for receiving radio signals and train control apparatus for automatically operating trains in accordance with each received signal.

Figure 9A:
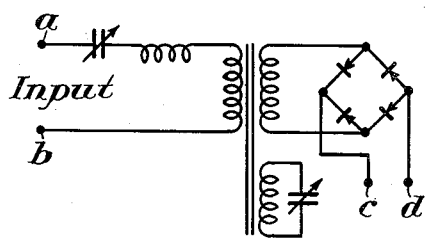

FIG. 9a is a circuit drawing of a typical tone receiver which may be used for each of the tone receivers shown in FIG. 9.

In each of the drawings, similar reference characters designate similar parts of the apparatus.

Referring to FIGS. 1 through 6, arranged numerically in the order from left to right as shown in FIG. 7, there is illustrated a stretch of monorail railway track over which trains travel in a direction from west to east, or from left to right as shown in the drawings. While we have illustrated our invention as being employed in a monorail railway system it is to be understood that the invention could just as well be employed in a conventional two-rail railway system or in any system in which vehicles move in a single direction over a trackway provided for the guidance of the vehicles along a predetermined route. In the stretch of monorail railway track illustrated in FIGS. 1 through 6 there is shown a succession of locations designated Loc. 1 through Loc. 6, the numerical designations of such locations corresponding with the number of the drawing figure in which the location is shown. This arrangement will be readily apparent from a glance at the drawings.

A plurality of signal blocks TS1 through TS6 is provided in the track stretch, not by insulated rail joints designating the ends of the signal blocks in the conventional manner, but by a section of a sectionalized electrical block conductor or one of a succession of block conductors for each block, each of which conductors extend the length of and define the ends of the respective signal block. Each block conductor or block conductor section is designated by the reference character BC followed by a numerical suffix corresponding to the numerical suffix of the signal block, the limits of which are defined by the ends of the respective block conductor or conductor section. For example, in FIGS. 1 and 2 the limits of signal block TS1 are defined by the ends of block conductor or conductor section BC1 which extends between Locs. 1 and 2. Similarly, in FIGS. 2 and 3 the limits of signal block TS2 are defined by the ends of block conductor BC2 which extends between Locs. 2 and 3. The arrangement of the signal blocks and block conductors for the remainder of the track stretch shown in FIGS. 1 through 6 will be readily apparent from the examples given and a brief examination of such drawing figures. It should be pointed out that each block conductor or section of block conductor extends parallel with the section of track included in the corresponding signal block and in close proximity thereto so that closely spaced coupling may continuously be provided between each respective conductor and a signal receiving device provided on each of the trains to travel the track stretch. This arrangement will become more apparent later in this description.

Figure 6:
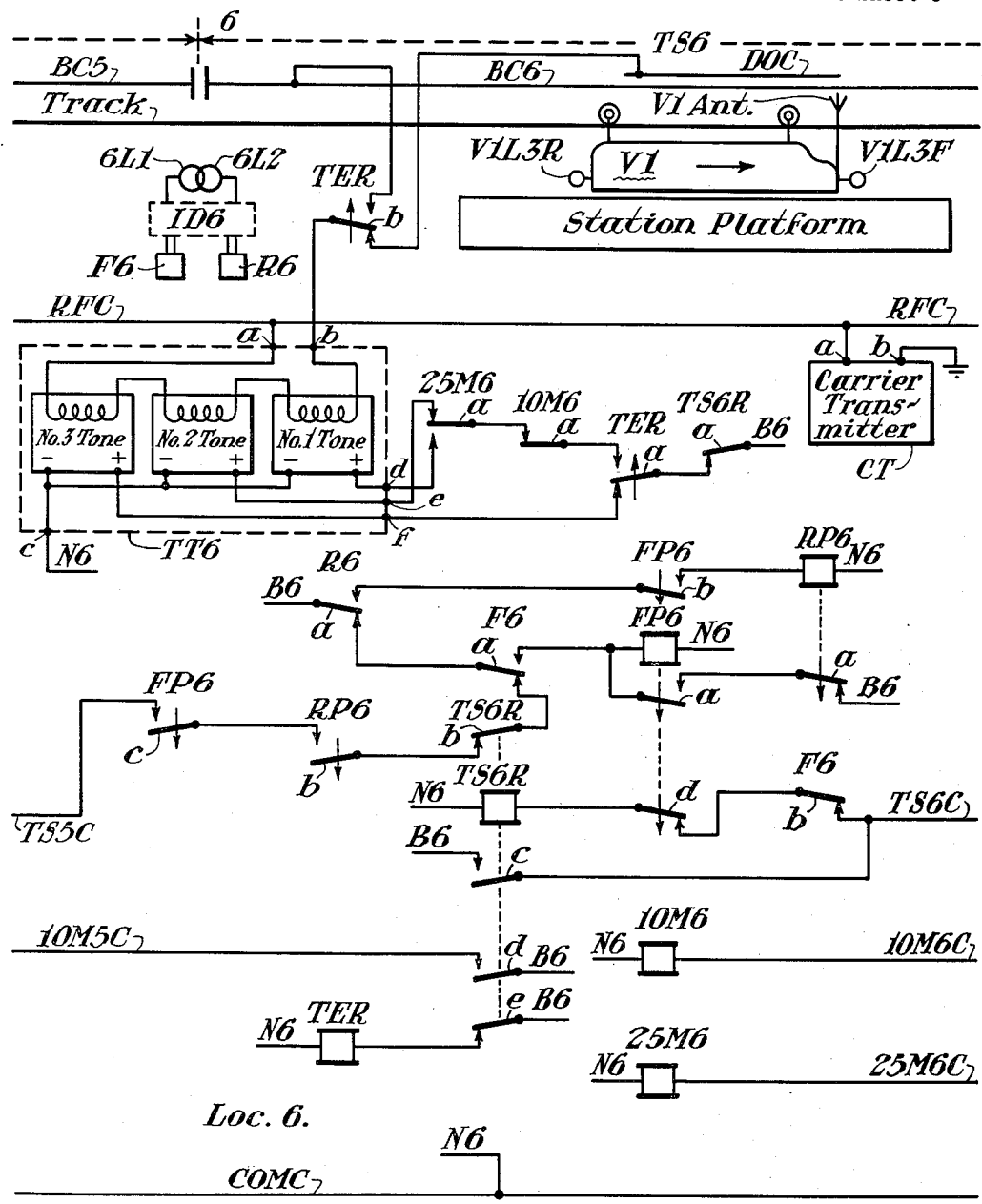

It is expedient at this point in the description to point out that a channel is provided for communication or the transmission of control signals between each of Locs. 1 through 6 and the trains traversing the track stretch and to be controlled. This channel is shown in the accompanying drawings as being a radio circuit with a carrier current channel capable of carrying several voice frequency or other low frequency carrier tones, hereinafter often referred to as signals, but may alternatively be an inductive carrier channel. A carrier transmitter CT shown in FIG. 6 provides the basic carrier current for the communication channel and the transmitter is assumed to have a self-contained power supply for supplying power for operation of the transmitter. Two output terminals a and b are provided on the transmitter and terminal b is connected to ground while terminal a is connected to an electrical conductor RFC which extends to each of the Locs. 1 through 6 to supply to each location the basic carrier current for the communication channel. For the purpose of the remainder of this description it will be assumed that the communication channel is a space radio channel. However, it is to be understood that if, as previously mentioned, an inductive carrier is to be used as the communication channel, the carrier transmitter CT would be one suitable for such type of channel. The purpose of supplying the carrier current from transmitter CT over conductor RFC to each of Locs. 1 through 6 will be more fully explained later.

It should be pointed out at this time that energy for the operation of direct current apparatus at each of Locs. 1 through 6 is furnished by a suitable source of current, preferably a battery of proper voltage and capacity, provided at each of the said locations. For the sake of simplicity these power sources are not shown in the drawings but the positive and negative terminals of each source are identified by reference characters B and N, respectively, followed by a suffix designating the location of each respective source. For example, the positive and negative terminals of the power source at Loc. 1 are designated B1 and N1, respectively, and the positive and negative terminals of the source at Loc. 4 are designated B4 and N4, respectively. The negative terminals N1 through N6 of the power sources at Locs. 1 through 6, respectively, are each connected to a common electrical conductor COMC (FIG. 1 through FIG. 6) which extends to each such location throughout the track stretch. The purpose of common conductor COMC will become apparent hereinafter.

First and second trains or vehicles V1 and V2, respectively, are shown occupying the track sections in signal blocks TS6 and TS4, respectively. As previously mentioned, these vehicles travel over the track stretch in a direction from west to east as indicated by the arrow on each vehicle and each is provided with a signal coupling device, here shown as an antenna, on the forward end of the vehicle. The antenna on vehicle V1 is designated V1ANT and that on vehicle V2 is designated V2ANT, and these antennas are, as previously mentioned, located on their respective vehicles so as to provide closely spaced coupling with the block conductors BC1 through BC6 as each respective vehicle traverses the track stretch. Although we have chosen to show the signal coupling devices employed in our invention as conventional antennas, these devices may in practice take the form of any suitable sort of signal coupling device such as loop antennas, pickup coils, or any other such device suitable for receiving the signals supplied to the block conductors.

Also provided on the front and rear ends of each of the vehicles are coils, loops or inductances each tuned to a predetermined frequency and so arranged on their respective vehicles that they will pass in close proximity to cooperating wayside coils located along the trackway and to be described. The coils located on the front and rear ends of vehicle V1 are designated V1L3F and V1L3R, respectively, and are tuned to predetermined first and second frequencies, respectively. Similarly, the coils located on the front and rear ends of vehicle V2 are designated V2L3F and V2L3R, respectively, and are also tuned to said predetermined first and second frequencies, respectively. It is to be understood that vehicles V1 and V2 are shown so that a complete operational example of the apparatus of our invention may be hereinafter given and that in actuality all trains or vehicles to traverse the track stretch will be equipped similarly to vehicles V1 and V2.

A set of the above-mentioned wayside coils which cooperate with the tuned train-carried coils is provided at the junction of each adjacent pair of signal blocks. That is, a set of such coils is provided at each of Locs. 1 through 6 at the entrance end of the corresponding signal block. For example, at Loc. 1 there is provided at the entrance end of signal block TS1, first and second coils 1L1 and 1L2, respectively, each of which is connected to a set of apparatus shown in block diagram form and designated ID1. The block diagram is shown connected to first and second normally released relays designated F1 and R1, respectively. The details of the previously described tuned train-carried coils and of the wayside apparatus comprising coils 1L1 and 1L2, apparatus ID1, and relays F1 and R1 form no part of our present invention, but for purposes of this description may be considered to be similar to the apparatus shown and described in Letters Patent of the United States No. 2,828,480, issued March 25, 1958, to Lawrence R. Golladay for Train Identification System. Referring to the single drawing of that patent, the tuned train-carried coils may each be considered to be similar to coil L3 of the patent drawing except each is tuned to different frequencies; coils 1L1 and 1L2 are similar to coils L1 and L2, respectively, of the patent; apparatus ID1 is similar to the apparatus designated 1, 2 and 4 in the patent, and relays F1 and F2 may be considered to be similar to relays CR1 and CR2 shown in the patent. It is sufficient for purposes of this description to point out that relay F1 in FIG. 1 of the present application becomes momentarily picked up when a train-carried coil such as V1L3F or V2L3F passes in close proximity to wayside coils 1L1 and 1L2, thereby indicating the passage of the front end of the respective train, and relay R1 becomes momentarily picked up when a train-carried coil such as V1L3R or V2L3R passes in close proximity to wayside coils 1L1 and 1L2, thereby indicating the passage of the rear end of the respective train or vehicle. For a complete understanding of the operation of relays F1 or R1 by the passage of tuned train-carried coils such as shown on vehicles V1 and V2, reference is made to the above referred to United States patent.

As previously stated, a similar set of apparatus such as wayside coils 1L1 and 1L2, apparatus ID1, and relays F1 and R1, is provided at each of Locs. 2 through 6, and each such set of apparatus operates, in the manner identical to that outlined for the set at Loc. 1, to indicate the passage of the front and rear ends of each respective train traversing the track stretch and passing each respective location. Similar parts of each such set of apparatus are designated by reference characters similar to that employed for the set of apparatus at Loc. 1, except the prefixes or suffixes, associating each set with its location, correspond with the respective location designation. This is readily apparent from FIGS. 1 through 6 of the drawings. Although we have herein shown the use of the train identification apparatus of the cited patent for detection of the passage of the front and rear ends of trains, it is to be understood that our invention is not to be confined to the use of such apparatus, but any other means for indicating the passage of front and rear ends of trains, such as train-actuated wayside trips etc. may be employed.

Before proceeding further with the description it is desired to point out several conventions employed in the drawings.

First, a plurality of relays which will be hereinafter discussed are shown in the drawings in the conventional manner. Several of the relays employed are slow to release and the contacts of such relays are shown by an arrow drawn vertically through the movable portions of the relay contacts with the head of the arrow pointed in the downward direction, that is, the direction in which the contacts are slow acting.

Secondly, the relay contacts are in some instances not disposed on the drawings directly below the geometric rectangles representing the respective relay windings but, where the contacts are not so disposed, the reference character designating the respective relay winding controlling each contact appears on the drawing directly above each contact or groups of contacts. This arrangement is apparent from a brief inspection of the drawings.

There is provided at each of Locs. 1 through 6 a tone transmitter unit, each comprising one or more tone or signal transmitters. These transmitter units at Locs. 1 through 6 are designated TT1 through TT6, respectively. Transmitter unit TT6 at Loc. 6 (FIG. 6) is the only unit that is shown in any detail, this unit comprising three tone or signal transmitters for producing tones designated #1 tone, #2 tone and #3 tone. The transmitter units at Locs. 1 through 5 are similar to unit TT6, except that transmitter unit TT5 (FIG. 5) comprises one tone transmitter for producing #1 tone only and the transmitter units TT1 through TT4 comprise two transmitters for producing #1 tone and #2 tone only. The reason that only one tone transmitter is required at Loc. 5 and the purpose of #3 tone transmitter at Loc. 6 will be fully set forth later in the description. Since tone transmitter unit TT6 comprises the largest number of tone transmitters, only the internal arrangement of that transmitter is shown in any detail and the internal arrangement of tone transmitter units TT1 through TT5 will be readily understood from a description of unit TT6, it being borne in mind, as outlined above, that units TT1 through TT5 comprise a lesser number of tone transmitters.

Referring to FIG. 6, each tone transmitter of transmitter unit TT6 produces, when energized, a different carrier current or tone of a frequency level that may be used to modulate the basic carrier current previously discussed and supplied to conductor RFC from carrier transmitter CT (FIG. 6). It will be understood that the #1 tone or signal transmitter provided in each of the units TT– at Locs. 1 through 5 produce tones or signals of the same frequency level as the #1 tone transmitter at Loc. 6 and, similarly, the #2 tone or signal transmitter provided in each of the units TT– at Locs. 1 through 4 produce tones or signals of the same frequency level as the #2 tone transmitter at Loc. 6.

Each tone or signal transmitter comprises a simple transistor oscillator circuit with an output winding on the feedback transformer as shown in FIG. 8. The oscillator circuit becomes active when a relatively low voltage direct current source is connected across the positive (+) and negative (–) terminals shown in FIG. 8 and also shown in FIG. 6 for each transmitter. Any other oscillator circuit arrangement which will provide similar results may also be used. The operation of such oscillator circuit arrangements is well known and no further description thereof is required. The output windings of the tone transmitters in unit TT6 are connected in series across terminals $a$ and $b$ provided on that unit (FIG. 6), terminal $a$ being connected to the carrier frequency conductor RFC, and terminal $b$ being connected over the front point of a contact $b$ of a relay TER, to be discussed, to signal block conductor BC6, or over the back point of said relay contact to an additional electrical conductor designated DOC and to be discussed. By this arrangement the basic carrier frequency supplied to terminal $a$ of unit TT6 from conductor RFC may be modulated by one or more of the carrier tones and supplied from terminal $b$ of unit TT6 to said conductor BC6 or DOC as hereinafter described. Such modulation of carrier currents by lower frequency carrier tones is well known and, it is believed, may be fully understood from this brief description.

A plurality of additional terminals $c$, $d$, $e$ and $f$ is also provided on transmitter unit TT6 and these terminals are connected internally in the unit to the tone transmitters to provide for modulation control. Terminal $c$ is connected in multiple to the negative terminal (–) of each of the tone transmitters in unit TT6, and externally is connected to negative terminal N6 of the battery at Loc. 6. Terminals $d$, $e$ and $f$ connect to the positive (+) terminals of the #1, #2 and #3 tone transmitters, respectively, and, as outlined above, the carrier current is modulated by the respective carrier tones according as energy from positive terminal B6 of the battery at Loc. 6 is supplied to said terminals $d$, $e$ and $f$. The circuits for supplying energy to said terminals will be described later.

Terminal $c$ of each of the tone transmitter units at Locs. 1 through 5 is connected to the negative terminal of the battery at the respective location, and terminals $d$ and $e$ of units TT1 through TT4 and terminal $d$ of unit TT5 may be connected to the positive terminal of the battery at each respective location, thereby providing at each such location modulation of the carrier frequency current. The circuits for supplying energy to said terminals $d$ and $e$ will also be discussed later in this description.

In addition to the previously discussed F and R front and rear end train detector relays provided at Locs. 1 through 4, respectively, there is provided at each of these locations a plurality of additional relays, the corresponding relays at each such location having similar functions as hereinafter described. A plurality of similar relays is also provided at Loc. 5, except that one less relay is required at that location, as will become apparent. At Loc. 6 similar relays are also provided and relay TER, previously mentioned, is also required at that location. Corresponding relays at each of Locs. 1 through 6 are designated by similar reference characters except that the numerical suffixes of the reference characters are changed at each location to agree with the numerical designation of that location.

Since the apparatus and circuits at each location, except as heretofore and hereinafter pointed out, is substantially identical, Loc. 3 has been selected as a typical location and the apparatus and circuits at that location will be described in detail. At other locations any variations from the typical apparatus of Loc. 3 will thereafter be described.

Figure 3:
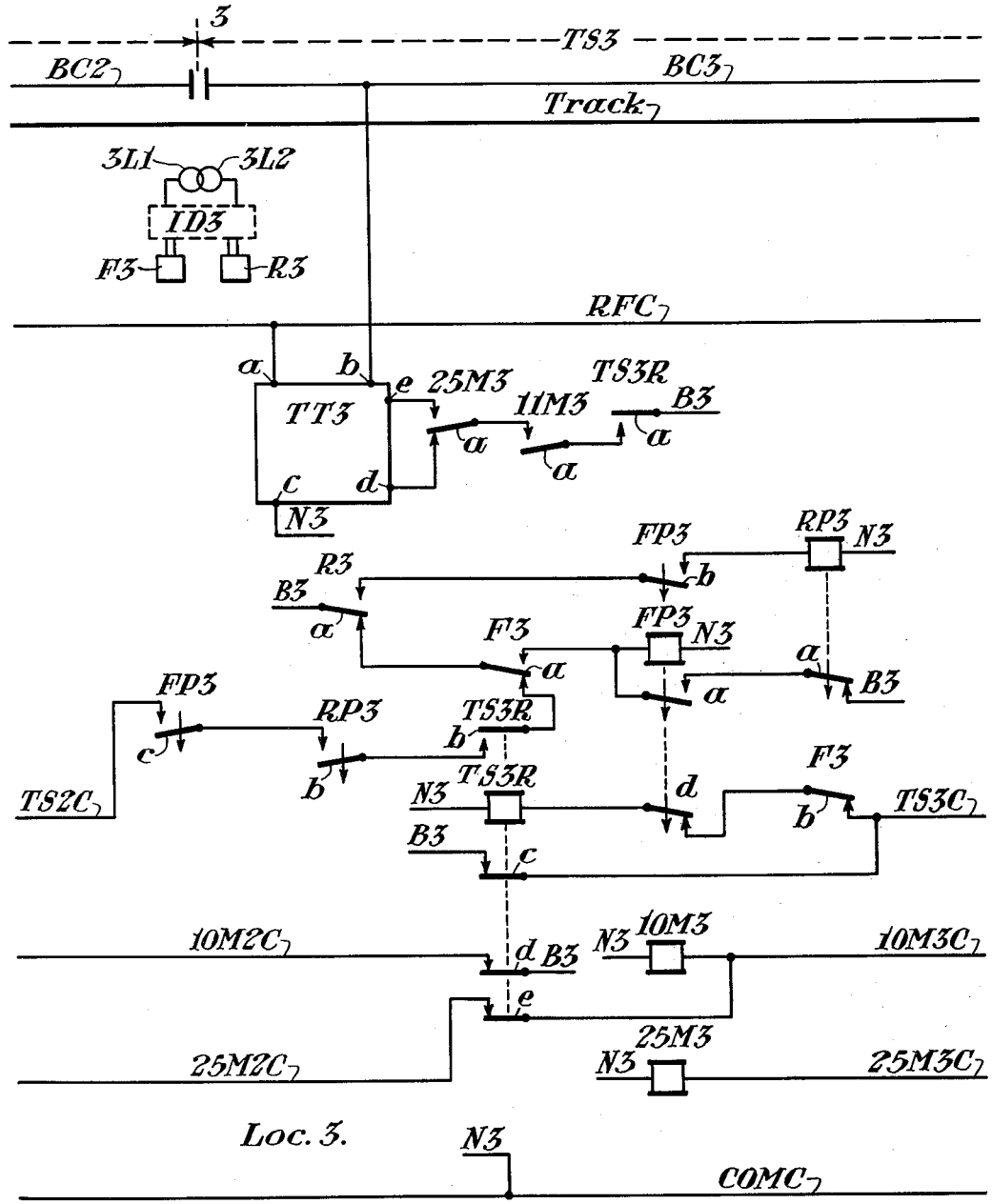

The previously mentioned relays provided at Loc. 3 are shown in FIG. 3 and comprise slow release repeater relays FP3 and RP3, which repeat the operation of the front and rear end detector relays F3 and R3, respectively; a signal block stick relay TS3R, and two speed control relays 10M3 and 25M3 which are associated with arbitrarily selected speeds of 10 m.p.h. and 25 m.p.h., respectively. The control circuits for each of these relays will now be described.

Relay FP3 has a pickup circuit which extends from terminal B3 of the battery at Loc. 3 over the back point of contact $a$ of relay R3, the front point of contact $a$ of relay F3 and through the winding of relay FP3 to terminal N3 of the battery at Loc. 3. Relay FP3 is provided with a stick circuit which may be traced from terminal B3 of the battery, through back contact $a$ of relay RP3, front contact $a$ of relay FP3 and the winding of relay FP3 to battery terminal N3. Relay FP3 therefore becomes picked up whenever relay R3 is released and relay F3 is momentarily picked up by the passage of the front end of a train past Loc. 3, and once relay FP3 so becomes picked up, it remains picked up until relay RP3 becomes picked up.

Relay RP3 has a pickup circuit which may be traced from battery terminal B3, through the front point of contact $a$ of relay R3, front contact $b$ of relay FP3 and the winding of relay RP3 to battery terminal N3. Relay RP3 therefore becomes picked up whenever relay R3 momentarily becomes picked up by the passage of the rear end of a train past Loc. 3 and relay FP3 is picked up.

By the above-described control circuits for relays FP3 and RP3, it is apparent that relay FP3 becomes picked up when the front end of a train enters signal block TS3, and thereafter remains picked up over its stick circuit until the rear end of the train exits from signal block TS2 and relay RP3 thereby becomes picked up and opens its back contact $a$ in the stick circuit for relay FP3. The slow release feature of relays FP3 and RP3 insures, for purposes hereinafter described, that the relays have their front contacts closed simultaneously for a brief period of time following the picking up of relay RP3.

Relay TS3R has a pickup circuit which extends from terminal B4 of the battery at Loc. 4 (FIG. 4) over the back point of contact $a$ of relay R4, the back point of contact $a$ of relay F4, back contact $b$ of relay TS4R, front contact $b$ of relay RP4, front contact $c$ of relay FP4, conductor TS3C extending between Loc. 3 and Loc. 4, back contact $b$ of relay F3 (FIG. 3) back contact $d$ of relay FP3, the winding of relay TS3R, terminal N3 of the battery at Loc. 3 and over conductor COMC to terminal N4 of the battery at Loc. 4. Relay TS3R has a stick circuit which normally maintains relay TS3R picked up and which extends from battery terminal B3 over front contact c of relay TS3R, back contact b of relay F3, back contact d of relay FP3 and through the winding of relay TS3R to battery terminal N3. Relay TS3R therefore becomes picked up whenever relays R4, F4 and TS4R are released and relays RP4 and FP4 are picked up, and once so picked up remain picked up so long as relays F3 and FP3 remain released.

Relay 10M3 has a pickup circuit extending from terminal B4 of the battery at Loc. 4 over front contact d of relay TS4R (FIG. 4), conductor 10M3C extending between Locs. 3 and 4, the winding of relay 10M3, terminal N3 of the battery at Loc. 3 and over conductor COMC to battery terminal N4 at Loc. 4. Relay 10M3 is therefore picked up whenever relay TS4R at Loc. 4 is picked up.

Relay 25M3 has a pickup circuit which may be traced from terminal B5 of the battery at Loc. 5 (FIG. 5), front conduct d of relay TS5R, conductor 10M4C extending between Locs. 4 and 5, front contact e of relay TS4R (FIG. 4), conductor 25M3C extending between Locs. 3 and 4, the winding of relay 25M3 (FIG. 3) terminal N3 of the battery at Loc. 3 and over conductor COMC to terminal N5 of the battery at Loc. 5. Relay 25M3 is therefore picked up whenever relays TS4R and TS5R at Locs. 4 and 5, respectively, are picked up.

From the above detailed description of the control circuits for the relays at Loc. 3, it is apparent that the TS–R relay at each location has a pickup circuit which is controlled by the R, F, RP, FP and TS–R relays at the next succeeding location; the 10M relay at each location has a control circuit which is controlled by the TS–R relay at the next succeeding location, and the 25M relay at each location has a control circuit which is controlled by the TS–R relays at the next two succeeding locations.

Referring to FIG. 1, it is pointed out that conductors TSOC, 10MOC and 25MOC are intended to extend to the next location to the west of Loc. 1 to control the TS–R, the 10M and the 25M relays, respectively, at that westward location, and that these conductors are shown merely to indicate that the system of our invention is applicable to a stretch of railway track of indefinite length and is not confined to the stretch of track shown in FIGS. 1 through 6. Conductors RFC and COMC are shown extending west from Loc. 1 for the same reason. Similarly, at Loc. 6 conductors TS6C, 10M6C and 25M6C are shown extending east from Loc. 6 to the next location to the east of Loc. 6 in order that the control for relays TS6R, 10M6 and 25M6 at Loc. 6 will be fully understood. Conductors RFC and COMC are also shown extending east from Loc. 6 to make the drawings complete. If, for some reason, there is difficulty experienced in understanding the system as shown, the track stretch shown may be assumed to comprise a circular railway and the conductors extending west from Loc. 1 may be assumed to connect to the corresponding conductors extending east from Loc. 6, and the system will then be readily understood.

Referring now to FIG. 6, there is shown within signal block TS6 a station platform at which each train or vehicle traversing the track stretch is to make a station stop. The location of the station platform within the signal block TS6 is so selected that the interruption of the propulsion power and the application of the brakes of each train upon entering signal block TS6 will bring the train to a stop adjacent the station platform. If the location of the station platform is fixed, the location of the exit and entrance ends of signal blocks TS5 and TS6, respectively, is so selected that the interruption of the propulsion power and the application of the brakes of each train upon entering signal block TS6 will cause the train to stop adjacent the station platform. The apparatus for so controlling the propulsion power and brakes of the trains will be described later.

The previously mentioned conductor DOC (FIG. 6) is a short length of conductor located wholly within the station platform area and extending parallel with and in close proximity to the railway track so as, similarly to conductor BC6, to provide closely spaced coupling with the antennas on the trains or vehicles to travel the track stretch. This conductor is employed to transmit to a vehicle standing at the station platform the carrier current modulated by #3 tone which constitutes a signal for vehicle door opening control. This will be described in greater detail later in an operational example of the apparatus of our invention.

The previously mentioned relay TER at Loc. 6 is a time delay relay employed to provide a delay period between the entrance of the front end of a vehicle into signal block TS6 and the transmission of a speed signal to the vehicle which speed signal controls the vehicle to move through the signal block. This time delay period is for the purpose of controlling the vehicle to make a stop at the station platform and to open its doors prior to proceeding through signal block TS6.

Relay TER has an energizing circuit which extends from battery terminal B6 over the back point of contact e of relay TS6R and through the control winding of relay TER to battery terminal N6. Thus the relay is energized to begin its timing cycle whenever relay TS6R is released. For the purpose of this description relay TER may be considered to be similar to the time delay relay shown and described in Letters Patent of the United States No. 1,966,965, issued July 17, 1934, to Branko Lazich and Harry E. Ashworth for Electrical Relay. It is sufficient for purposes of this description, however, to point out that contacts a and b of relay TER (FIG. 6) are normally closed against their back contact points as shown and are actuated to open their back contact points and close their front contact points only after a predetermined time interval following the energization of the winding of the relay. Contacts a and b of relay TER are, therefore, shown with an arrow drawn vertically through the movable portion of the contacts with the head of the arrow pointed in the upward direction, that is, the direction in which the contacts are slow acting. Following an actuation of contacts a and b of relay TER from their back to their front contact points, the front contact points will remain closed until the winding of relay TER is again deenergized. Upon such deenergization the front and back contact points of the relay immediately become open and closed again, respectively, and the front contact points can again be controlled to close only after another time delay period following the energization of the relay winding. Relay TER is selected so as to provide a time delay period of sufficient duration to permit a train entering signal block TS6 to be controlled to a stop at the station platform, and to open its doors for a prescribed period of time before the doors are again controlled to close and the train is controlled to start and continue its movement through signal block TS6.

The circuits for controlling the signal or tone transmitter units TT to transmit their various carrier tones or signals will now be described. As previously outlined, transmitter unit TT6 (FIG. 6) is capable of transmitting first, second and third tones or signals. These signals represent a low speed, a high speed and a train door control, respectively. Since a station platform is shown only in signal block TS6 the #3 tone transmitter is required only at Loc. 6. However, it is to be understood that in actual practice the #3 tone or signal would be provided at each location where a door opening control is to be actuated.

The circuit for supplying energy from battery terminal B6 to terminal d of transmitter unit TT6 and thereby energizing the #1 tone transmitter to transmit a signal, extends from said battery terminal over back contact *a* of relay TS6R, the front point of contact *a* of time delay relay TER, front contact *a* of relay 10M6 and the back point of contact *a* of relay 25M6 to terminal *d* of unit TT6. The circuit for supplying energy to terminal *e* of unit TT6 and thereby causing the #2 tone to be transmitted may be similarly traced except that it extends over the front point of contact *a* of relay 25M6 to said terminal *e*. When a train has just stopped at the station platform as shown in FIG. 6, the time delay period of relay TER has not yet expired and energy is supplied to terminal *f* of unit TT6 over a circuit extending from battery terminal B6 over back contact *a* of relay TS6R and the back point of contact *a* of relay TER to said terminal *f*. The #3 tone transmitter in unit TT6 is, therefore, energized at this time to transmit the third or door opening control signal. As previously pointed out, when the back point of contact *b* of relay TER is closed, terminal *b* of transmitter unit TT6 is connected to conductor DOC and, therefore, when #3 tone transmitter is energized to transmit its signal, such signal is supplied to said conductor. When the time delay period of relay TER has expired and relay TER opens the back points and closes the front points of its contacts *a* and *b*, the door opening control signal is terminated and #1 or #2 tone is supplied to block conductor BC6 in accordance with the traffic conditions to the east of Loc. 6.

Since all trains traversing the track stretch shown in FIGS. 1 through 6 are to make a stop at the station platform located in signal block TS6, the speed of each train must be reduced to a low speed before the train enters signal block TS6. Therefore, when each train enters signal block TS5, only a low speed signal should be transmitted to the train so that it will be insured that the speed of the train has been reduced to its low speed before entering signal block TS6. For this reason, as previously outlined, transmitter unit TT5 comprises only a #1 tone or signal transmitter and is therefore provided with input terminal *d* only. The circuit for supplying energy to terminal *d* of transmitter unit TT5, and thereby energizing the #1 tone transmitter within the unit, extends from battery terminal B5 over back contact *a* of relay TS5R and front contact *a* of relay 10M5 to said terminal *d*. Terminals *a* and *b* of unit TT5 connect to conductors RFC and BC5, respectively, and carrier current from conductor RFC is modulated by the slow speed #1 tone and supplied to block conductor BC5 whenever relays TS5R and 10M5 are released and picked up, respectively.

At each of Locs. 1, 2, 3 and 4, low or high speed signals may at different times be transmitted to the trains. Therefore the transmitter units at each of these locations are shown provided with input terminals *d* and *e*. The circuits for supplying energy to these terminals on the units at each said location are identical and, therefore, only these circuits for unit TT4 will be traced in detail. These circuits extend from battery terminal B4 over back contact *a* of relay TS4R, front contact *a* of relay 10M4, and thence over the front and back points of contact *a* of relay 25M4 to terminals *e* and *d* respectively, of unit TT4. Terminals *a* and *b* of unit TT4 are connected to conductors RFC and BC4, respectively, and when relay 10M4 is energized and relays TS4R and 25M4 are released, the #1 tone transmitter in unit TT4 modulates the carrier current from conductor RFC and supplies a first or low speed signal to conductor BC4. Similarly, when relay TS4R is released and relays 10M4 and 25M4 are energized, the #2 tone transmitter in unit TT4 modulates the carrier current from conductor RFC and supplies a second or high speed signal to conductor BC4.

At Locs. 1 through 3 terminals *b* of transmitter units TT1, TT2 and TT3 are connected to block conductors BC1, BC2 and BC3, respectively, and terminals *a* of said transmitters are connected to conductor RFC. In view of the above description of the control circuits to unit TT4 the control circuits to terminals *d* and *e* of units TT1, TT2 and TT3 need not be described in detail since these circuits are similar to those described for unit TT4.

Having thus described the trackside apparatus of our invention, we will now describe the apparatus carried on each vehicle or train to traverse the track stretch shown in FIGS. 1 through 6. However, it should first be pointed out that the details of the train-carried apparatus of FIG. 9 form no part of our present invention but are shown and described only to the extent necessary to make the specification complete.

A source of direct current such as a battery of proper voltage and capacity is required on each train for supplying energy for the operation of the train-carried apparatus. For purposes of simplicity, however, such source is not shown in FIG. 9 but its positive and negative terminals are designated by references VB and VN, respectively.

There is illustrated conventionally in FIG. 9 a carrier receiver CR and its associated antenna ANT connected to an input terminal *a* on the receiver. A second terminal *b* on the receiver is shown connected to ground in the usual manner. This carrier receiver CR is capable of receiving the basic carrier current supplied to the previously discussed block conductors BC1 through BC6 (FIGS. 1 through 6) and of providing an output which includes any of the three modulating tones which is supplied to said conductors. It is to be understood however that the receiver receives only the signal or tone supplied to the block conductor with which antenna ANT is at any one time closely coupled. In this connection it should be pointed out that antenna ANT corresponds to antennas V1ANT and V2ANT on vehicles V1 and V2 shown in FIGS. 4 and 6. Terminals VB and VN of the vehicle-carried power source are connected to terminals *c* and *d* of the receiver CR to provide energy for operation of the receiver.

Output terminals *e* and *f* on receiver CR are connected in multiple to input terminals *a* and *b*, respectively, on three tone or signal receivers designated No. 1 tone receiver, No. 2 tone receiver and No. 3 tone receiver. Each tone receiver is provided with output terminals *c* and *d* across which the winding of a relay is connected. The relay connected to terminals *c* and *d* of the No. 1 tone receiver is a low speed control relay designated LSR, the relay connected to terminals *c* and *d* of the No. 2 tone receiver is a high speed control relay designated HSR, and the relay connected to terminals *c* and *d* of the No. 3 tone receiver is a vehicle door control relay designated DOR.

A typical circuit for a tone receiver that may be employed is shown in FIG. 9a. This receiver is provided with input terminals *a* and *b* and output terminals *c* and *d* which correspond with the input and output terminals, respectively, on each of the receivers shown in FIG. 9. The receiver shown in FIG. 9a includes filter circuits, and each of the receivers shown in FIG. 9 is to be understood to include similar filter circuits that select only the signal or tone frequency of the respective receiver. Output terminals *c* and *d* of the receiver shown in FIG. 9a correspond to the output terminals *c* and *d* of each tone receiver shown in FIG. 9. Therefore, the output from the transformer winding included in each receiver in FIG. 9 is rectified and supplied to output terminals *c* and *d* on each respective receiver. Relays LSR, HSR and DOR are, therefore, energized only when their respective tone receiver receives current of the correct tone frequency, that is, #1 tone, #2 tone and #3 tone, respectively. Operation of the receiver circuit shown in FIG. 9a is well known and it is to be understood that other well known receiver circuits may be used. It is considered sufficient for purposes of this description to point out that when a tone frequency is transmitted over the carrier current communication channel and is received by carrier receiver CR (FIG. 9) it is selectively received only by the corresponding tone receiver and the corresponding relay LSR, HSR or DOR becomes energized.

A brake valve control magnet BVM, a door opening control mechanism DOM and an engine throttle mechanism TCM are all shown in FIG. 9 in block diagram form. A pneumatically operated relay PNR is also shown in FIG. 9. As noted on the drawing magnet valve BVM controls the release and application of the train brakes. That is, magnet BVM releases the train brakes when energized and applies the brakes when deenergized. The control circuits for magnet valve BVM will be discussed hereinafter.

The doors of the train or vehicle are normally biased to a closed position and are actuated to and maintained in an open position only when energy is supplied to door opening mechanism or controller DOM. Such door opening mechanisms are well known in the art and, since the details thereof form no part of our present invention, no detailed description of the controller itself is necessary. The control circuits for mechanism DOM will be described later.

Throttle control mechanism TCM comprises two relays T1 and T2 which, when energized, actuate the throttle of the train to control the speed of the train to low and high speeds respectively. One side of the control windings of relays T1 and T2 are connected in multiple to a terminal c on mechanism TCM, and the other side of the control windings of relays T1 and T2 connect to terminals a and b, respectively, on mechanism TCM. Terminal c of mechanism TCM is connected to battery terminal VN. The control circuit for relay T1 extends from terminal VB of the battery over front contact b of low speed relay LSR, terminal a on mechanism TCM, the winding of relay T1, and terminal c on mechanism TCM to terminal VN of the battery. The control circuit for relay T2 extends from battery terminal VB over front contact b of high speed relay HSR, terminal b on mechanism TCM, the winding of relay T2 and terminal c on mechanism TCM to terminal VN of the battery. Thus the speed of the train is controlled to low or high speeds according as relays LSR or HSR, respectively, are energized.

The above-mentioned pneumatically operated relay PNR is connected by the conduit, shown at the top of the geometric figure representing the relay, to the brake pipe as indicated in FIG. 9. This relay is so constructed that its contact a is open whenever the train brakes are in their released position and is closed whenever the brakes are fully applied, that is, when the air supplied to the train brakes for their release is fully exhausted following the deenergization of magnet valve BVM, contact a of relay PNR closes. Such pneumatic relays and their operation are well known in the art.

Magnet valve BVM has a control circuit which extends from battery terminal VB over the back point of contact a of relay DOR, front contacts a of relays LSR and HSR in multiple and through the winding of the magnet valve to battery terminal VN. Magnet valve BVM is therefore energized and the train brakes become released whenever relay DOR is released and either relay LSR or HSR is energized.

Door opening mechanism DOM has a control circuit which extends from battery terminal VB over the front point of contact a of relay DOR, front contact a of pneumatic relay PNR and to a terminal a on the mechanism DOM. A terminal b on mechanism DOM is connected to battery terminal VN. Mechanism DOM is, therefore, energized to open the doors of the train whenever relay DOR is energized and relay PNR is actuated to close its front contact a thereby indicating that the train brakes are fully applied.

The train-carried apparatus of FIG. 9 is shown in the condition it assumes when the train on which it is provided has stopped at the station platform in FIG. 6, that is, as if the apparatus shown was located on train or vehicle V1 shown in FIG. 6. For this reason relay DOR is shown energized and relay PNR is shown actuated to have its contact a closed. Thus mechanism DOM is energized to control the opening of the doors of the train. Relays LSR and HSR are both shown released, and magnet valve BVM and relays T1 and T2 in mechanism TCM are all deenergized. Thus the train brakes are applied and no propulsion power is supplied to the train engine or motors by throttle control mechanism TCM. The reasons for the positions of relays DOR, LSR and HSR will be covered hereinafter in operational examples of the apparatus of our invention. As previously mentioned, each of the trains traversing the track stretch shown in FIGS. 1 through 6 is provided with apparatus identical to that shown in FIG. 9.

We will now describe several operational examples of the apparatus of our invention. Referring to FIG. 6, when a train or vehicle such as vehicle V1 enters signal block TS6 the coil V1L3F on the front end of the train causes the momentary energization of relay F6 as heretofore set forth. The momentary energization of relay F6 opens at back contact b of that relay the stick circuit for relay TS6R, which relay is normally held up over its stick circuit when there is no vehicle in block TS6, and this relay therefore now releases. The closing of the front point of contact a of relay F6 momentarily closes the pickup circuit for relay FP6, which picks up and completes its stick circuit thereby being maintained picked up for a period of time. The release of relay TS6R opens at its front contact d the control circuits for relay 10M5 at Loc. 5 (FIG. 5) and relay 25M4 at Loc. 4 (FIG. 4) and those relays release. The release of relay TS6R also closes at its back contact a (FIG. 6) the energizing circuit to terminal f of tone transmitter unit TT6 and No. 3 tone transmitter in that unit is energized to supply a door opening signal to conductor DOC as previously outlined. The release of relay TS6R also closes at back contact e of that relay and energizing circuit for time delay relay TER and that relay starts its timing cycle.

The entrance of the front end of vehicle V1 into signal block TS6 also moves antenna V1ANT from its coupling relation with block conductor BC5 and into coupling relation with block conductor BC6. However, at this time no signals are supplied to conductor BC6 as relay TER has just begun its timing cycle. Therefore, relay LSR or relay HSR (FIG. 9), whichever was energized, is released and the brakes of vehicle V1 are applied, since magnet valve BVM becomes deenergized. The supply of propulsion power to the engine of the vehicle V1 is also interrupted since the relays T1 and T2 in mechanism TCM are both released. Vehicle V1 is therefore controlled to come to a stop adjacent the station platform as previously outlined.

When antenna V1ANT moves into coupling relationship with conductor DOC (FIG. 6) it receives from that conductor the door opening signal and relay DOR (FIG. 9) on vehicle V1 becomes energized. When contact a of relay PNR (FIG. 9) closes, insuring that the brakes of the train are fully applied, door opening mechanism DOM is energized as previously described and the doors of the train are controlled to open for a part of the time period during which the train is stopped adjacent the station platform. It is to be noted that the length of conductor DOC and its location are so selected that it cannot provide coupling with the antenna of a vehicle or train unless all the doors of the train are adjacent the station platform, and that the length of the station platform is determined by the longest trains to travel the track stretch.

Following the time delay provided by relay TER (FIG. 6), that relay transfers its contacts a and b from their back contact points to their front contact points. The opening of the back point of contact a of relay TER interrupts the energization of No. 3 tone transmitter in unit TT6 and the door opening signal is interrupted. The closing of the front point of contact a of relay TER energizes No. 1 or No. 2 tone transmitter in unit TT6, depending on the position of contact a of relay 25M6. The position of this contact depends on traffic conditions to the east of signal block TS6, as will become apparent hereinafter. The opening of the back point of contact b of relay TER and the closing of the front point of that contact disconnects terminal b of unit TT6 from conductor DOC and connects that terminal to block conductor BC6. A low or high speed signal is, therefore, supplied to conductor BC6, depending on whether the No. 1 tone transmitter or the No. 2 tone transmitter in unit TT6 is energized.

The interruption of the energization of the No. 3 tone transmitter in unit TT6, as pointed out above, interrupts the door opening control signal and relay DOR (FIG. 9) is released thereby deenergizing mechanism DOM. The train doors of vehicle V1 are thus controlled to close. When the No. 1 or No. 2 tone receiver on vehicle V1 receives its respective signal, relay LSR or HSR becomes energized, in turn energizing magnet valve BVM and releasing the train brakes. The energization of relay LSR or HSR also closes an energizing circuit for relay T1 or T2, respectively, in the throttle control mechanism TCM, and propulsion power is again supplied to the engine of the vehicle. The vehicle starts and accelerates to a low speed or high speed depending on whether relay LSR and therefore relay T1 are energized, or whether relay HSR and therefore relay T2 are energized. The train moves eastward over the track stretch and out of the territory shown in the drawings.

It should be pointed out that relay TS6R remains released as the train traverses signal block TS6 and, therefore, relay TER remains actuated to supply a speed control signal to conductor BC6 so long as the train is in signal block TS6. When relay TS6R again becomes picked up, as will be hereinafter described for a TS–R relay at another location, time delay relay TER is deenergized and contacts a and b of that relay again open their front and close their back contact points. The apparatus at Loc. 6 will then again be in its normal position.

Returning to the time when the front end of vehicle V1 entered signal block TS6 and relay FP6 became picked up closing its stick circuit, the operation of relays R6, RP6 at Loc. 6 and relay TS5R at Loc. 5 (FIG. 5) will be described when the rear end of vehicle V1 vacates signal block TS5. It should be noted in this connection that relay TS5R at Loc. 5 is released while vehicle V1 is traversing signal block TS5. The momentary picking up of relay R6, when coil V1L3R on the rear end of vehicle V1 passes the rear exit end of signal block TS5, indicates that the rear end of the vehicle has vacated signal block TS5 and therefore relay TS5R may again become picked up.

The picking up of relay R6 momentarily closes, at the front point of contact a of that relay, the pickup circuit for relay RP6 which then becomes picked up. The picking up of relay RP6 opens the stick circuit for relay FP6. However, the slow release feature of relay FP6, as well as that of relay RP6, insures that the front contacts of both of these relays will remain closed until after relay R6 again releases. The release of relay R6 completes the pickup circuit for relay TS5R (FIG. 5) including the back point of contact a of relay R6 and the front points of contacts b and c of relays FP6 and RP6, respectively. Relay TS5R thus again becomes picked up and completes its stick circuit to maintain itself picked up. Following the slow release periods of relays FP6 and RP6, these relays release, and relays F6, R6, FP6 and RP6 at Loc. 6 all again occupy their normally released positions. The release of relays FP6 and RP6 again opens the pickup circuit for relay TS5R at Loc. 5 but, as stated above, that relay is maintained picked up over its stick circuit.

While vehicle V1 is traveling through signal block TS6, relay 10M5 at Loc. 5 (FIG. 5) remains released. Thus, if vehicle V2 shown in FIG. 4 should enter signal block TS5 while vehicle V1 is still in signal block TS6, its receipt of signals will be interrupted since the energizing circuit to terminal d of transmitter unit TT5 will be open at front contact a of relay 10M5 and vehicle V2 will be controlled to stop. However, the entrance of vehicle V2 into signal block TS5 will release relay TS5R in a manner similar to that in which relay TS6R was released when vehicle V1 entered signal block TS6, and the circuit for supplying energy to terminal d of unit TT5 is prepared. When relay TS6R thereafter becomes picked up, relay 10M5 will become picked up and, if vehicle V2 occupies or thereafter enters signal block TS5, it will receive a low speed signal and will proceed at that speed into block TS6 and make a station stop at the station platform in a manner similar to that described above for vehicle V1. The operation of relays F5, R5, FP5, RP5 and TS5R is similar to that described for the corresponding relays at Loc. 6 and no detailed description of such operation is necessary.

Figure 4:
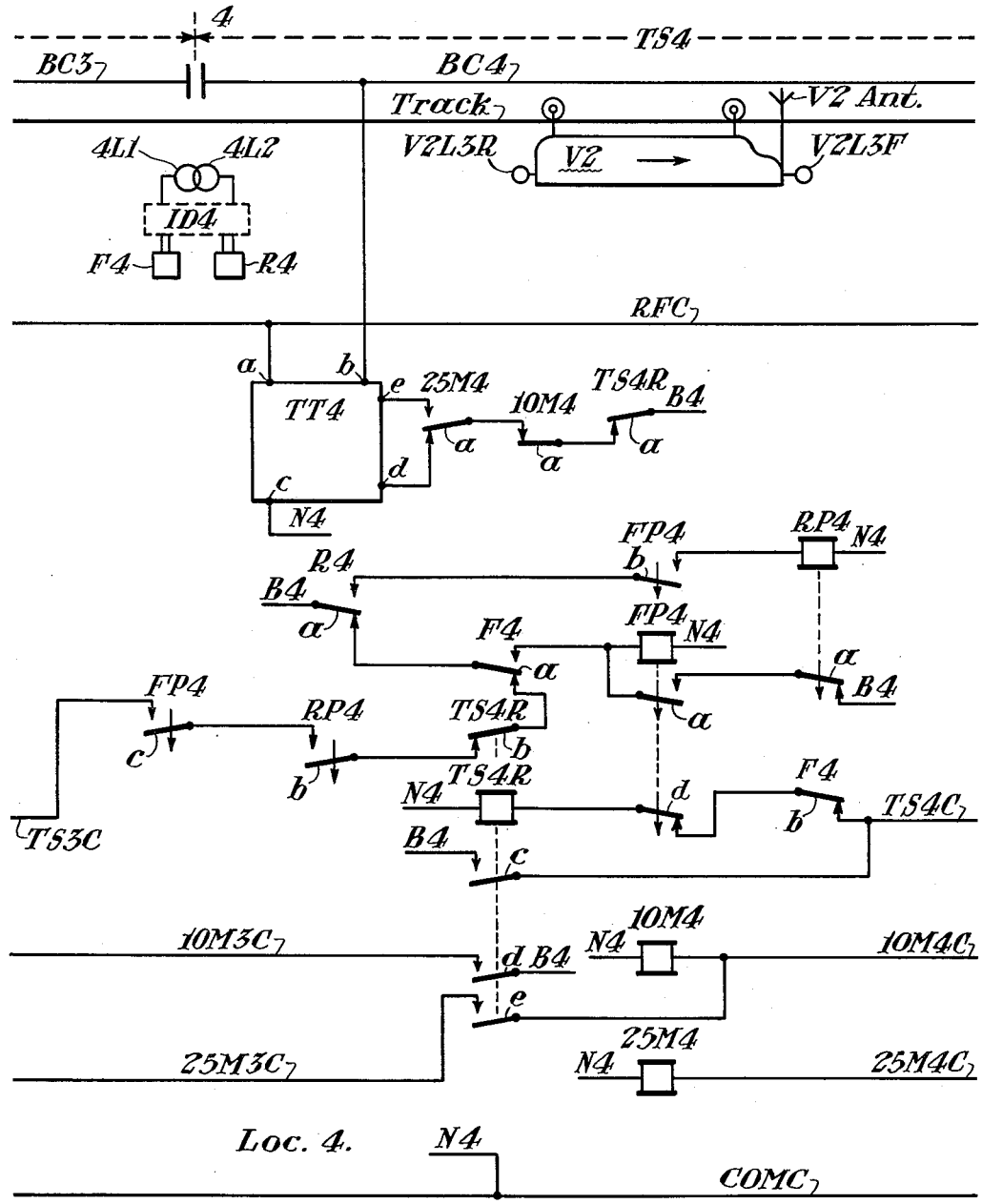

If vehicle V2 enters signal block TS4 while vehicle V1 occupies signal block TS6, the relays at Loc. 4 will be actuated to the positions shown in FIG. 4 and vehicle V2 will receive from conductor BC4 a low speed signal only, since relay 25M4 is released due to the open front contact d of relay TS6R at Loc. 6. When vehicle V1 subsequently vacates signal block TS6 relay 25M4 will again be energized and vehicle V1 can then receive a high speed signal if it still occupies signal block TS4. Before the exit of vehicle V2 from signal block TS3, that is, when the rear end of vehicle V2 still occupies signal block TS3, relay TS3R at Loc. 3 is released, but the passage of the rear end of vehicle V2 past the junction of signal blocks TS3 and TS4 energizes relay R4, and relays FP4 and RP4 at Loc. 4 momentarily close the pickup circuit for relay TS3R at Loc. 3. When vehicle V2 is traveling through signal block TS4 as shown in FIG. 4, therefore, relay TS3R at Loc. 3 is energized and is maintained energized over its stick circuit.

Figure 2:
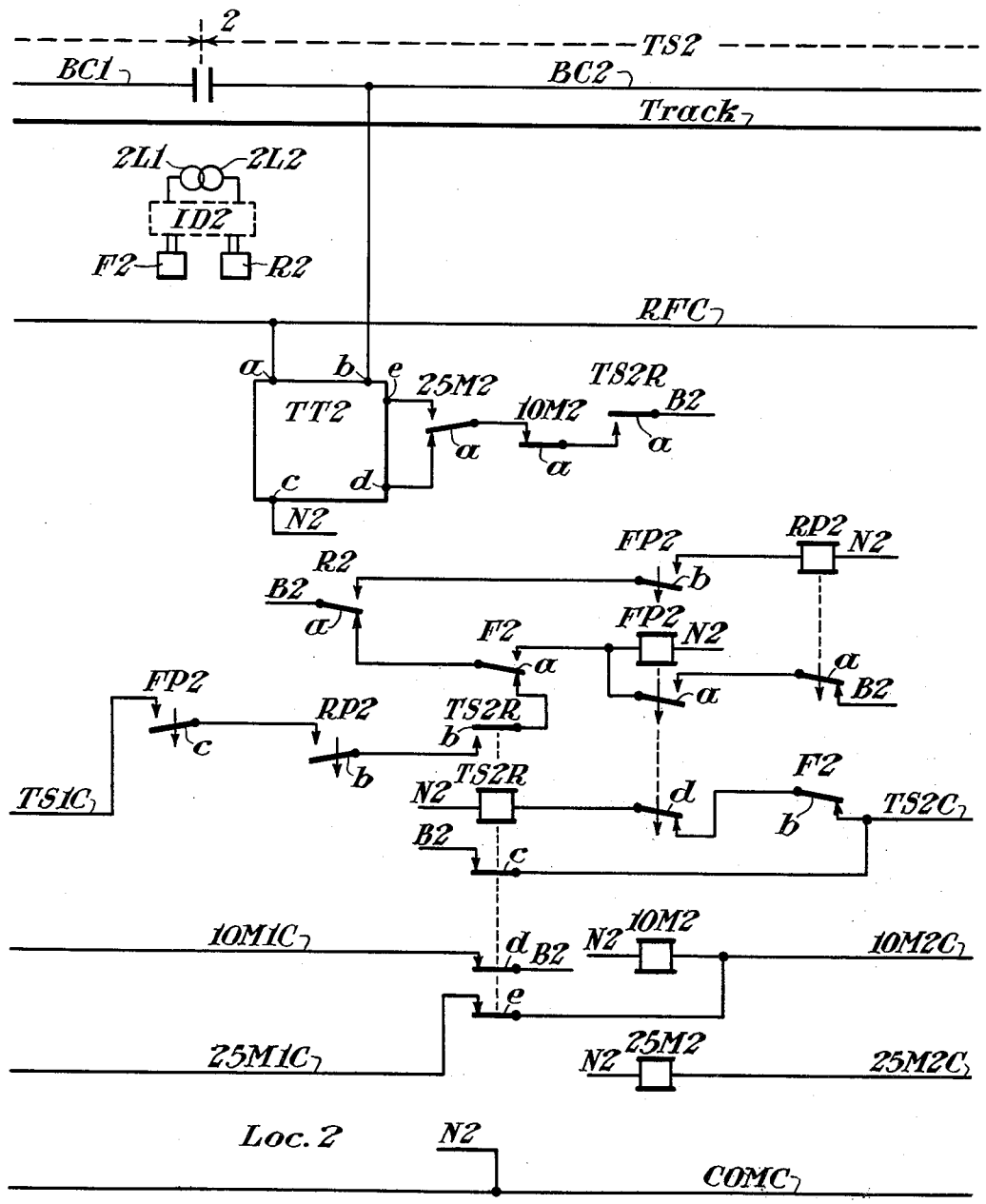

Referring further to FIG. 3, relay 10M3 is released while vehicle V2 occupies signal block TS4, since the pickup circuit for that relay is open at front contact d of relay TS4R (FIG. 4). Similarly, relay 25M3 (FIG. 3) is released at this time since the pickup for that relay is open at front contact e of relay TS4R. At Loc. 2 (FIG. 2) relay 25M2 is released at this time since its pickup circuit is open at front contact d of relay TS4R. Thus, while vehicle V2 occupies signal block TS4, no speed signal can be supplied to conductor BC3 for signal block TS3 and, if a train should enter signal block TS3, the train would be controlled to stop until vehicle V2 vacates block TS4. Also, while vehicle V2 occupies signal block TS4, only a low speed signal can be supplied to conductor BC2 for signal block TS2 (FIG. 2) and a train then entering that signal block would be controlled to reduce its speed to its low speed range. In this manner a "stop" buffer zone of almost the length of one full block is maintained behind each preceding train and such buffer zone may at times be extended to almost the length of two full signal blocks. In addition to this "stop" buffer zone a "slow speed" buffer zone extending approximately the length of an entire signal block is maintained behind each preceding train. Thus, referring to FIG. 1, a high speed signal may be supplied to block conductor BC1, as shown in the drawing, only when there are at least two vacant immediately succeeding signal blocks as shown in FIGS. 2 and 3. Similarly, when there are two vacant signal blocks immediately succeeding any other signal block, except signal block TS5 as previously pointed out, the high speed signal may be supplied to the block conductor for each such other signal block.

Although we have shown our invention as employing only two speed signals (#1 and #2 tones) it is to be understood that additional higher speed ranges may be provided by employing an additional tone frequency and associated apparatus for each additional speed range. An additional speed relay, similar to the 10M or 25M relays, would also be provided at each location for each additional higher speed signal, and the control circuit for each additional speed relay at each location would be carried over a front contact of the TS–R relay at an additional succeeding location. That is, if one additional higher speed range is provided (assume 40 m.p.h. for example) the control circuit for the additional speed relay 40M at each location would extend over a front contact of each of the TS–R relays at the next three succeeding locations. Similarly, if still another higher speed range is provided (assume 60 m.p.h. for example), the control circuit for the speed relay 60M at each location would extend over a front contact of each of the TS–R relays at the next four locations succeeding the location of the 60M relay. This is believed readily apparent from a brief study of the control circuits for relays 10M and 25M shown in FIGS. 1 through 6.

Figure 5:
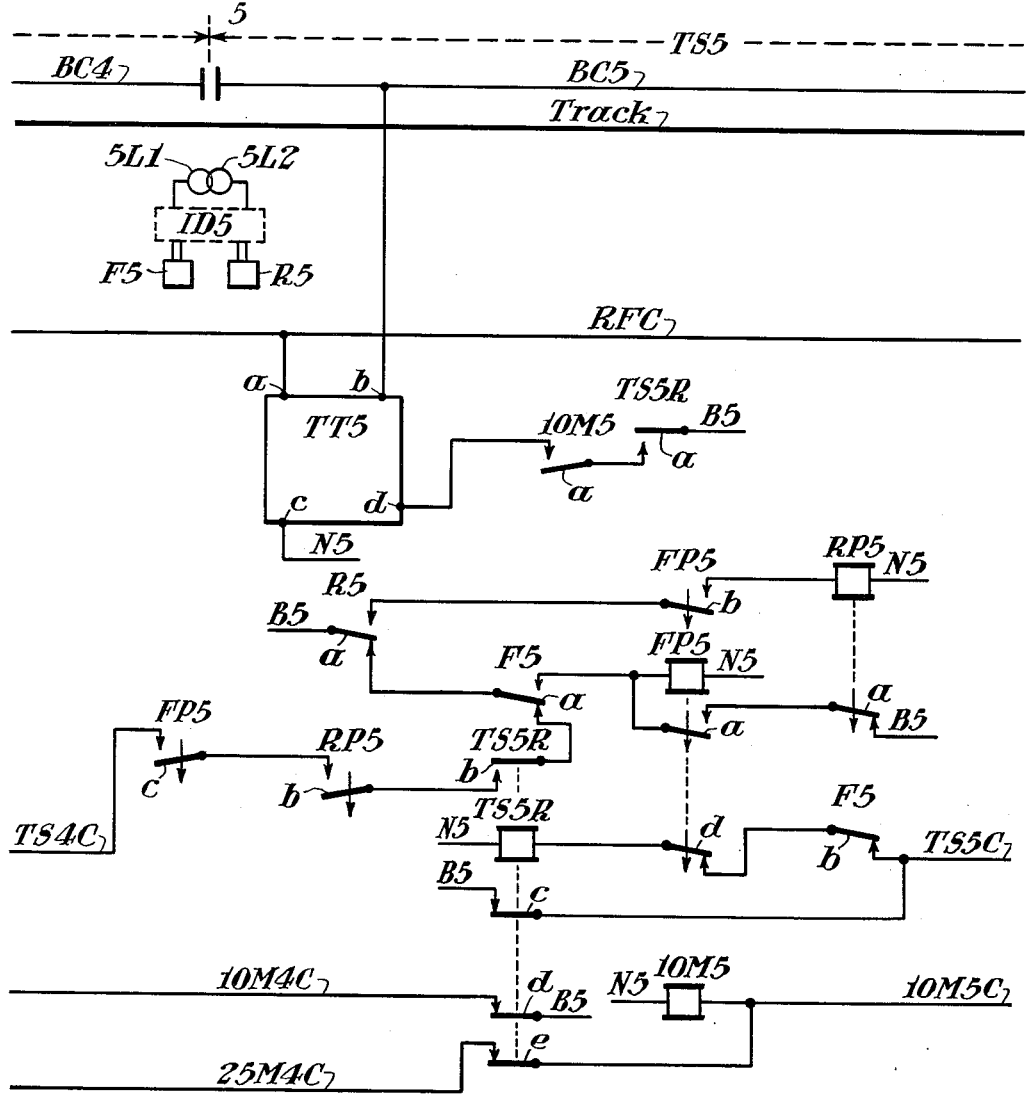
Figure 5:

It is also to be understood that in actual practice additional station stop locations such as shown in FIG. 6 may be provided and the apparatus at each location preceding the entrance end of a station stop signal block would be similar to that shown at Loc. 5 (FIG. 5).

Although we have herein shown and described only one form of apparatus embodying our invention, it should be understood that various changes and modifications may be made therein within the scope of the appended claims without departing from the spirit and scope of our invention.

Having thus described our invention, what we claim is:

1. A system for automatically operating vehicles traveling a prescribed route between a succession of selected locations comprising, a normally energized stick relay at each said location, first and second normally energized control relays at each location, means at each location responsive to the passage of the front end of a vehicle for deenergizing the stick relay at that location, means responsive to the deenergization of each stick relay for deenergizing the first and second control relays at the first preceding location and the second control relay at the second preceding location, means at each location responsive to the passage of the front and rear ends of a vehicle for reenergizing the stick relay at the first preceding location; a conductor associated with each location and extending between the associated location and the first succeeding location, each conductor extending along and parallel to said route; means responsive to the deenergization of the stick relay at each location for supplying to the conductor associated with that location a signal selected from a plurality of signals in accordance with the energized and deenergized positions of the first and second control relays at that location, an antenna on each vehicle to travel said route each antenna so located on its respective vehicle that it is continuously in close proximity with and receives from the conductor extending along the section of the route then being traveled by that vehicle any of said plurality of signals supplied to that conductor; and means on each said vehicle, responsive to the signals received from said conductors by the antenna on that vehicle, for controlling the starting of the vehicle when the vehicle is at rest, the speed of the vehicle in accordance with the received one of said signals, and the stopping of the vehicle when the receipt of signals is terminated.

2. An automatic train operation system for a stretch of railway track over which trains travel in a single direction comprising, a plurality of locations in said track stretch, each said location defining the exit and entrance ends of preceding and succeeding signal blocks, respectively; first and second detector relays, a stick relay, and first and second control relays at each said location; means at each said location, responsive to the passage of the forward and rear ends of a train past that location, for momentarily energizing the first and second detector relays, respectively, at that location; means at each said location, responsive to the successive energization of the first and second detector relays at that location, for energizing the stick relay at the first preceding location; means at each said location, controlled by the detector relays and the stick relay at that location, for maintaining that stick relay energized when once energized and so long as those detector relays remain deenergized; a circuit for energizing the first control relay at each location, each such circuit including a front contact of the stick relay at the first succeeding location; a circuit for energizing the second control relay at each location, each such circuit including in series a front contact of the stick relay at each of the first and second succeeding locations; a signal conductor extending parallel with and in close proximity to the track of said stretch, said conductor being sectionalized at each said location and each such section of the conductor being associated with the corresponding signal block; means at each said location, controlled by the stick relay and the first and second control relays at that location, for supplying first and second signals each representing a different train speed to the section of conductor ahead of that location according as the second control relay is energized or deenergized, respectively, when the stick relay is deenergized and the first control relay is energized, and means on each train to travel said track stretch for receiving the signal supplied to the section of conductor for the signal block which the train then occupies, and means responsive to the receipt of said signal for controlling the starting of the train and the speed of the train in accordance with the received signal, and the stopping of the train when the receipt of the signal is interrupted.

References Cited in the file of this patent
UNITED STATES PATENTS

| | | |
|---|---|---|
| 1,816,628 | Williams et al. | July 28, 1931 |
| 2,061,027 | Espenschied et al. | Nov. 17, 1936 |